United States Patent [19] [11] Patent Number: 4,561,292
Pugnale et al. [45] Date of Patent: Dec. 31, 1985

[54] DOUBLE-WALL UNDERGROUND CONTAINER FOR STORING LIQUIDS AND LEAK DETECTING MEANS THEREFOR

[75] Inventors: Peter J. Pugnale, The Woodlands; John M. Clark; William R. Penland, both of Conroe, all of Tex.

[73] Assignee: Owens-Corning Fiberglas Corporation, Toledo, Ohio

[21] Appl. No.: 740,705

[22] Filed: Jun. 3, 1985

Related U.S. Application Data

[63] Continuation of Ser. No. 572,034, Jan. 19, 1984, abandoned.

[51] Int. Cl.⁴ .............................................. G01M 3/04
[52] U.S. Cl. .................................... 73/49.2; 220/426; 220/441; 340/605
[58] Field of Search ...................... 73/49.2; 220/3, 83, 220/426, 441; 340/605, 620

[56] References Cited

U.S. PATENT DOCUMENTS

| 2,927,437 | 3/1960 | Rae | 220/426 |
| 3,661,294 | 5/1972 | Pearson et al. | 220/3 X |
| 4,012,945 | 3/1977 | Bergstrand | 73/49.2 |
| 4,110,739 | 8/1978 | Kidd | 73/49.2 |

FOREIGN PATENT DOCUMENTS

| 1175502 | 8/1964 | Fed. Rep. of Germany | 73/49.2 |
| 2120794 | 12/1983 | United Kingdom | 73/41.5 R |

Primary Examiner—Charles Hart
Attorney, Agent, or Firm—Ronald C. Hudgens; Patrick P. Pacella; Paul J. Rose

[57] ABSTRACT

An aboveground reservoir is connected to the space between inner and outer tanks of an underground double-wall storage container for liquids. Leak detecting liquid fills the space between the tanks and extends to a surface level in the reservoir. Sensing means detects a drop in the level of the liquid in the reservoir and activates a signal when a leak develops in either of the inner and outer tanks.

9 Claims, 4 Drawing Figures

DOUBLE-WALL UNDERGROUND CONTAINER FOR STORING LIQUIDS AND LEAK DETECTING MEANS THEREFOR

This is a continuation of application Ser. No. 572,034, filed Jan. 19, 1984 and now abandoned.

TECHNICAL FIELD

This invention relates generally to underground tanks, and more particularly to a glass fiber reinforced plastic double-wall underground tank with leak detecting means.

BACKGROUND ART

Environmental protection is becoming increasingly important. Single-wall underground tanks are advisedly tested periodically for leaks. Many times small leaks go undetected, and often by the time a large leak is detected, pollution of the environment has already occurred.

DISCLOSURE OF INVENTION

In accordance with the invention, a glass fiber reinforced plastic double-wall underground tank with leak detecting means is provided.

BRIEF DESCRIPTION OF DRAWINGS

The invention is more fully explained hereinafter with reference to the accompanying drawings in which.

BEST MODE OF CARRYING OUT THE INVENTION

Figure 1:
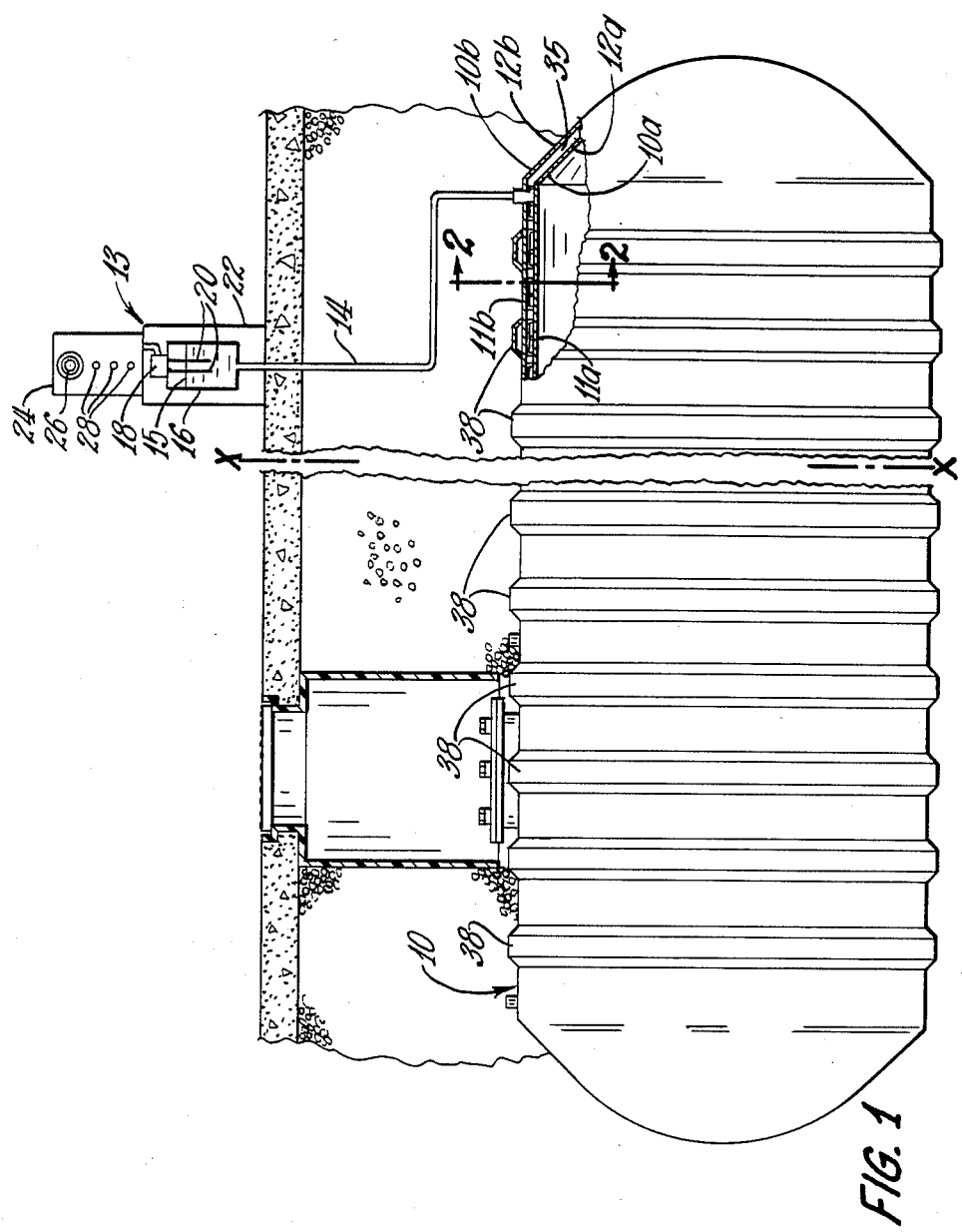
FIG. 1 is an elevational view, partly in section, of a double-wall tank constructed in accordance with the invention and installed underground, with leak detecting means aboveground.

With reference to the drawings and in accordance with the invention, FIG. 1 shows a double-wall tank 10 installed underground and connected to above-ground leak detecting means 13 by a pipe or conduit 14. Essentially, the tank 10 comprises inner and outer tanks 10a and 10b with space therebetween, the space being filled with a leak detecting liquid 15, preferably an anti-freeze solution, which also fills the pipe 14 and partially fills a reservoir or container 16, the pipe 14 being in communication with the space between the inner and outer tanks 10a and 10b and with the container 16. Besides the container 16, the leak detector 13 includes an electrical control box 18 mounted above the container 16 and having a pair of sensing probes 20 normally extending below the surface of the leak detecting liquid 15. The container 16 and control box 18 are mounted in a housing 22. A monitoring board 24 is shown mounted on the housing 22, but the board could be remotely located inside a building. A bell or buzzer 26 and a plurality of lights 28 are mounted on the board 24 and electrically connected to the control box 18. Regardless of whether the inner tank 10a is full or empty and regardless of whether the tank 10 is installed in dry ground or below the water table, if a leak develops in either the inner tank 10a or the outer tank 10b, the level of the leak detecting liquid 15 in the container 16 will decrease. When this level drops below the sensing probes 20, the bell or buzzer 26 will emit an audible signal and the lights 28 will give a visual indication that a leak has developed.

Figure 4:
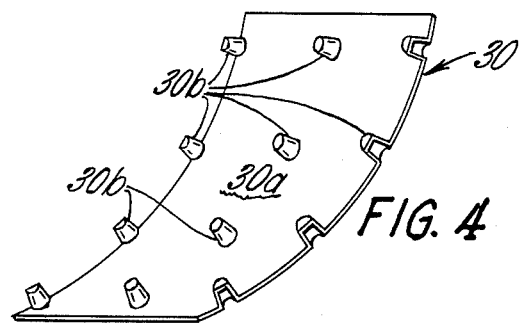
FIG. 4 is a fragmentary perspective view of a molded plastic spacing strip of the type used to manufacture the double-wall tank of the invention.
Figure 2:
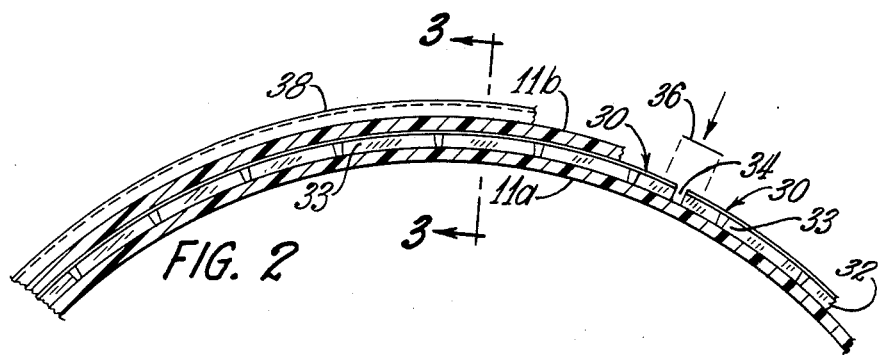
FIG. 2 is a fragmentary sectional view taken generally along the line 2—2 of FIG. 1.
Figure 3:
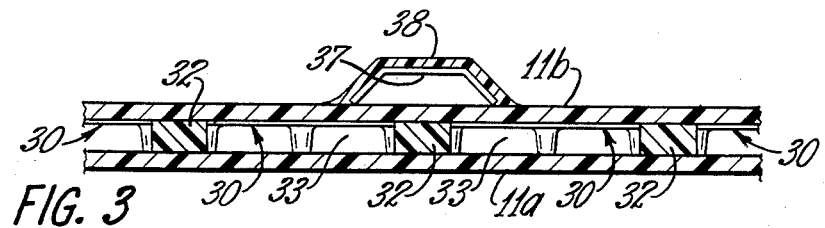
FIG. 3 is a fragmentary sectional view taken generally along the line 3—3 of FIG. 2.

The double-wall tank 10 is made in two halves such as would lie on opposite sides of a vertical plane represented by the line X—X in FIG. 1. Each half includes an inner cylindrical wall 11a and an inner end cap 12a. Preferably, the end cap 12a is shaped in accordance with the disclosure of U.S. Pat. No. 4,071,161, having a spherical central portion merging into a frusto-conical portion joined to the wall 11a. The wall 11a may be formed on a collapsible mandrel such as disclosed in U.S. Pat. No. 4,233,020, and preferably, the end cap 12a is formed integrally with wall 11a on an end cap mold mounted on the mandrel, somewhat as disclosed in U.S. Pat. No. 4,255,302. The procedure for forming the wall 11a may be somewhat as disclosed in U.S. Pat. No. 3,700,512. A surface mat, hardenable liquid resin, chopped glass strand, and a filler such as sand are applied to the mandrel surface and the resin is cured. The end cap 12a is also formed of surface mat, hardenable liquid resin, chopped glass strand, and a filler such as sand. A plurality of molded plastic spacing strips 30, best shown in FIG. 4, are then put in place one at a time around the wall 11a at spaced intervals. A carriage feeds dry continuous glass filament windings (not shown) around the mandrel and a spacing strip 30 is fed under the windings. The carriage stops at pre-programmed intervals along the mandrel. Each spacing strip 30 includes a sheet-like body portion 30a having cup-like projections 30b. At opposite logitudinal edges of a strip 30, the cup-like projections are cut in half when a strip 30 is severed from a larger sheet. The cup-like projections 30b engage the wall 11a and space the sheet-like body portion 30a of a spacing strip 30 away from the wall 11a. After the spacing strips 30 are in place, a relatively thin layer (not separately shown) of resin-impregnated continuous glass filament windings is applied over each strip, eventually becoming part of the wall 11b, and an annular connecting rib 32 formed of resin-impregnated continuous glass filament windings is applied on the wall 11a between each pair of adjacent strips 30. The ribs 32 eventually connect the cylindrical walls 11a and 11b of the tanks 10a and 10b. An annular chamber 33 is defined by each pair of adjacent ribs 32, the spacing strip 30 therebetween, and the corresponding portion of the cylindrical wall 11a. Before the outer tank 10b is formed, provision is made to interconnect all the annular chambers 33 and two end cap chambers 35, one of which is shown in FIG. 1, by cutting away portions of the ribs 32 to provide two sets of generally aligned passageways extending axially of the tank 10, one set being indicated by numeral 34 in FIG. 2. The cutting for each set of aligned passageways may be carried out by two passes of a rotary saw axially of the cylindrical wall 11a, which incidentally also cut away portions of the spacing strips 30. After the cut portions are removed, a strip 36 of tape is secured over the area of the cut to maintain the passageways when the wall portion 11b is laid up. In a finished tank 10, one set 34 of generally aligned passageways extending through the ribs 32 axially of the tank 10 is disposed essentially at the top of the tank and one is disposed essentially at the bottom.

A previously formed end cap skin (not separately shown) made of hardenable liquid resin and chopped glass strand and provided with a short cylindrical flange is then telescoped by its flange over the end of the wall 11a and the end spacing strip 30 with its thin layer of filament windings, in spaced relationship to the end cap 12a. The main portion of the end cap skin eventually becomes the inner surface of the end cap 12b.

The wall 11b is then formed over the spacing strips 30 and the connecting ribs 32 by application of hardenable liquid resin, chopped glass strand, and a filler such as sand. The end cap 12b is similarly formed over the end cap skin (not separately shown).

Annular forms 37 are then secured in place by dry windings around the wall 11b at spaced intervals and ribs 38 are formed thereover by glass mats or axial tape and resin-impregnated continuous glass filament windings, similarly to the formation of the ribs in U.S. Pat. No. 3,700,512.

Two tank halves are so formed and fastened together at a butt joint by alternate layers of glass mat and woven roving impregnated with hardenable liquid resin and applied on the interior of the tank 10a and on the exterior of the tank 10b, similarly to the way the single wall tank halves are fastened together at the exterior surface in U.S. Pat. No. 3,700,512.

When the leak detecting liquid 15 is added to the container 16, it fills all the annular spaces between the walls 11a and 11b and between each pair of connecting ribs 32 as well as the space between the end caps 12a and 12b at both ends of the tank 10, all these spaces being connected by the sets 34 of generally aligned passageways.

Various modifications may be made in the structure shown and described without departing from the scope of the invention as set forth in the appended claims.

We claim:

1. A double-wall underground container for storing liquids, comprising a generally cylindrical reinforced plastic inner tank, a generally cylindrical reinforced plastic outer tank larger than and surrounding the inner tank in spaced relationship thereto, each of said tanks having a generally cylindrical wall portion and a pair of opposed end cap portions, a plurality of reinforced plastic annular connecting ribs spaced from each other axially of the tanks and connecting the cylindrical wall portions of the tanks to each other, annular chambers between the tanks being defined by the cylindrical wall portions of the tanks and pairs of adjacent connecting ribs, two opposed end chambers between the tanks being defined by the end cap portions of the tanks, and the connecting ribs having two sets of generally aligned passageways extending therethrough axially of the tanks, one set being disposed essentially at the tops of the tanks and another set being disposed essentially at the bottoms of the tanks, the passageways interconnecting all the annular chambers and the two end chambers.

2. An underground storage container as claimed in claim 1 wherein the inner and outer tanks are reinforced with chopped glass strands.

3. An underground storage container as claimed in claim 1 wherein the connecting ribs are reinforced with continuous glass filament windings.

4. A leak detecting system for an underground storage container as claimed in claim 1 comprising an aboveground reservoir, a conduit connecting the inside of said reservoir to the space between said tanks, leak detecting liquid filling the space between the tanks, filling the conduit, and at least partially filling the reservoir, means for sensing a drop in the level of the liquid in the reservoir, and means for providing a signal in response to a sensed drop in said level.

5. A double-wall container comprising a generally cylindrical inner tank, a generally cylindrical outer tank larger than and surrounding the inner tank in spaced relationship thereto, and a plurality of generally annular connecting ribs, said inner tank, outer tank, and connecting ribs comprising hardened hardenable liquid resin, each of said tanks having a generally cylindrical wall portion substantially concentric with that of the other about a common axis, the common axis being substantially horizontal in an installed position of the double-wall container, said connecting ribs being generally perpendicular to and surrounding said common axis, being substantially parallel to each other, being spaced from each other generally along said common axis, being disposed between and connecting the cylindrical wall portions of the tanks to each other, and together with the cylindrical wal portions defining annular chambers surrounding said common axis and respectively being disposed between pairs of adjacent ones of the ribs, and each of the connecting ribs disposed between a pair of adjacent ones of said annular chambers having passageway means therethrough interconnecting the respective pair of annular chambers.

6. A double-wall container as claimed in claim 5 wherein the resin includes glass fiber reinforcing means.

7. A double-wall container as claimed in claim 5 wherein each of said tanks has a pair of opposed end cap portions respectively spaced from corresponding end cap portions of the other of said tanks and two end ribs respectively adjacent opposite ends of the cylindrical wall portions of the tanks have passageway means therethrough connecting the spaces between corresponding end cap portions at opposite ends of the tanks respectively to the adjacent annular chambers, the end cap portions comprising hardened hardenable liquid resin.

8. A double-wall container as claimed in claim 7 wherein the end caps include glass fiber reinforcing means.

9. A leak detecting system for a double-wall container as claimed in claim 7 comprising a reservoir above the container, a conduit connecting the inside of the reservoir to the space between said tanks, leak detecting liquid filling said annular chambers and the spaces between said end cap portions, filling the conduit, and at least partially filling the reservoir, means for sensing a drop in the level of the liquid in the reservoir, and means for providing a signal in response to a sensed drop in said liquid level.

* * * * *